(12) United States Patent
Satish et al.

(10) Patent No.: US 8,095,488 B1
(45) Date of Patent: Jan. 10, 2012

(54) METHOD AND APPARATUS FOR MANAGING CONFIGURATIONS

(75) Inventors: Venkeepuram Satish, Fremont, CA (US); Navin Kabra, Pune (IN); Subhojit Roy, Pune (IN); Himanshu Ashwani, Pune (IN)

(73) Assignee: Symantec Corporation, Mountain View, CA (US)

( * ) Notice: Subject to any disclaimer, the term of this patent is extended or adjusted under 35 U.S.C. 154(b) by 892 days.

(21) Appl. No.: 12/006,156

(22) Filed: Dec. 31, 2007

(51) Int. Cl.
*G06E 1/00* (2006.01)
*G06E 3/00* (2006.01)
(52) U.S. Cl. .............. 706/20; 706/12; 706/21
(58) Field of Classification Search .......... None
See application file for complete search history.

(56) References Cited

U.S. PATENT DOCUMENTS

| | | | |
|---|---|---|---|
| 6,498,791 B2 | 12/2002 | Pickett et al. | 370/353 |
| 6,512,526 B1 | 2/2003 | McGlothlin et al. | 345/762 |
| 6,539,456 B2 | 3/2003 | Stewart | 711/113 |
| 6,543,047 B1 | 4/2003 | Vrhel, Jr. et al. | 717/121 |
| 6,550,006 B1 | 4/2003 | Khanna | 713/2 |
| 6,560,606 B1 | 5/2003 | Young | 707/100 |
| 6,564,112 B1 | 5/2003 | Factor | 700/97 |
| 6,577,229 B1 | 6/2003 | Bonneau et al. | 340/10.41 |
| 6,578,141 B2 | 6/2003 | Kelley et al. | 713/1 |
| 6,598,131 B2 | 7/2003 | Kedem et al. | 711/147 |
| 6,601,095 B1 | 7/2003 | Duffield et al. | 709/222 |
| 6,601,166 B1 | 7/2003 | Avyar et al. | 713/2 |
| 6,615,365 B1 | 9/2003 | Jenevein et al. | 714/6 |
| 6,633,916 B2 | 10/2003 | Kauffman | 709/229 |
| 6,662,267 B2 | 12/2003 | Stewart | 711/113 |
| 6,684,327 B1 | 1/2004 | Anand et al. | 713/2 |
| 6,711,668 B1 | 3/2004 | Wojcieszak et al. | 713/201 |
| 6,748,525 B1 | 6/2004 | Hubacher et al. | 713/1 |
| 6,757,837 B1 | 6/2004 | Platt et al. | 714/4 |
| 6,768,901 B1 | 7/2004 | Osborn et al. | 455/230 |
| 6,802,062 B1 | 10/2004 | Oyamada et al. | 718/1 |
| 6,804,774 B1 | 10/2004 | Larvoire et al. | 713/2 |
| 6,810,478 B1 | 10/2004 | Anand et al. | 713/2 |
| 7,043,724 B2 | 5/2006 | Blume et al. | 717/168 |
| 7,065,566 B2 | 6/2006 | Menard et al. | 709/223 |
| 7,065,637 B1 | 6/2006 | Nanja | 713/1 |
| 7,082,521 B1 | 7/2006 | Nanja | 713/1 |
| 7,747,709 B2 | 6/2010 | Behrendt et al. | 709/220 |

(Continued)

FOREIGN PATENT DOCUMENTS

CN 200810098346 5/2008

(Continued)

OTHER PUBLICATIONS

Cronk et al., R., "Rule-Based Expert System for Network Management and Operations: An Introduction", IEEE Network, pp. 11 total, 1988.*

(Continued)

*Primary Examiner* — Jeffrey A Gaffin
*Assistant Examiner* — Adrian Kennedy
(74) *Attorney, Agent, or Firm* — Campbell Stephenson LLP

(57) ABSTRACT

A method and apparatus for managing configurations of computer resources in a datacenter is described. In one embodiment, a method comprises analyzing multiple configurations using rule information to produce an analysis result where each configuration in the multiple configurations defines a configuration of a resource that is managed by the data center, training a Bayesian classifier using the analysis result, and classifying a second configuration using the trained Bayesian classifier.

17 Claims, 4 Drawing Sheets

U.S. PATENT DOCUMENTS

| | | | |
|---|---|---|---|
| 2002/0100036 A1 | 7/2002 | Moshir et al. | 717/173 |
| 2002/0107843 A1 | 8/2002 | Biebesheimer et al. | 707/3 |
| 2003/0028825 A1 | 2/2003 | Hines | 714/37 |
| 2003/0167245 A1 | 9/2003 | Murata | 706/46 |
| 2004/0221146 A1 | 11/2004 | Baumann | 713/1 |
| 2004/0236576 A1* | 11/2004 | Thiesson et al. | 704/255 |
| 2004/0243692 A1 | 12/2004 | Arnold et al. | 709/220 |
| 2005/0228789 A1 | 10/2005 | Fawcett et al. | 707/6 |
| 2006/0101402 A1 | 5/2006 | Miller et al. | 717/124 |
| 2007/0100812 A1* | 5/2007 | Simske et al. | 707/5 |
| 2008/0244028 A1 | 10/2008 | Le et al. | 709/208 |
| 2008/0301081 A1 | 12/2008 | Karnik et al. | 706/48 |
| 2009/0040947 A1 | 2/2009 | Krivopaltsev | 370/255 |

FOREIGN PATENT DOCUMENTS

| | | |
|---|---|---|
| EP | 745929 | 4/1996 |
| EP | 841616 | 5/1998 |
| EP | 1998252 | 12/2008 |
| JP | 2009-048611 | 3/2009 |

OTHER PUBLICATIONS

Goodman et al., R., "Rule-Based Neural Networks for Classification and Probability Estimation", Neural Computation 4, pp. 781-804, 1992.*

Chebrolu et al., S., "Feature Deduction and Ensemble Design of Intrusion Detection Systems", Comuters and Security 24, pp. 295-307, 2005.*

Androutsopoulos et al., I., "An Evaluation of Naive Bayesian Anti-Spam Filtering", Machine Learning in the New Information Age, pp. 9-17, 2000.*

Pelikan et al., M., "Hierarchical Bayesian Optimization Algorithm", Springerlink, pp. 63-90, 2006.*

Ei-Arini et al., K., "Bayesian Detection of Router Configuration Anomalies", SIGCOMM '05, pp. 1-8, Aug. 22-26, 2005.*

Isard, M., "Autopilot: Automatic Data Center Management", ACM SIGOPS Operating Systems Review, vol. 41, Issue 2, pp. 60-67, Apr. 2007.*

Ambardar, Sidarth et al., "Dynamic Router Configuration Management for Wireless Mobile Environments," Radio and Wireless Conference (RAWCON '98), IEEE, Aug. 9-12, 1998; IEEE, Aug. 9, 1998, pp. 31-34.

Arshad, Naveed et al., "Deployment and Dynamic Reconfiguration Planning for Distributed Software Systems," Proceedings of the 15th IEEE International Conference on Tools with Artificial Intelligence (ICTAI '03), Nov. 3-5, 2003. IEEE Comp. Soc, vol. CONF. 15. Nov. 3, 2003, pp. 39-46.

Basmaciyan, Rober; "Data Center Consolidation—the Logical move;" Enterprise Data Center, Sep. 2004. pp. 1-13.

Blume, William et al., "System and services for handling computing environments as documents" U.S. Appl. No. 11/430,212, filed May 8, 2006; consisting of Specification, Claims and Abstract (21 pages); and Drawings (8 sheets).

Bose, Indranil; Radha K. Mahapatra; "Business Data Mining—A Machine Learning Perspective—Information & Management;" vol. 39, Issue 3, Dec. 20, 2001; pp. 211-225.

Chizi and Maimon, "Dimension Reduction and Feature Selection;" Data Mining and Knowledge Discovery Handbook; 005; pp. 93-111.

Debenham, Clive, "Taos: The operating system," Mar. 1995, Newsgroups: comp. parallel, pp. 1-8.

European Search Report mailed Sep. 12, 2008: EPC Application No. 08009816.3-2211; 10 pages.

Foundation Template Software's Application Developer's Training Course, SNAP 8.0, Module 7, 1997, 37 pages.

Friesenhahn, B.; "Autoconf Makes for Portable Software"; BYTE, McGraw-Hill Inc.; vol. 22; No. 11; Nov. 1, 1997; pp. 45-46.

Gencay, Eray et al., "SANchk: An SQL-Based Validation System for SAN Configuration," 10th IFIP/IEEE International Symposium on Integrated Network Management; 2007 (IM '07); IEEE; PI; May 1, 2007; pp. 333-342.

Halle, Sylvain et al., "Self-Configuration of Network Devices with Configuration Logic," Autonomic Networking Lecture Notes in Computer Science; LNCS; Springer; Berlin; DE; vol. 4195; Jan. 1, 2006; pp. 36-49.

Heimbigner, Dennis et al.; "A Framework for Analyzing Configurations of Deployable Software Systems"; Fifth IEEE International Conference on Engineering of Complex Computer Systems, 1999 (ICECCS '99); Oct. 18-21, 1999; Comput. Soc.; pp. 32-42.

Henry, Mike, Intel Corporation, *Extending PXE to Mobile Platforms*, Jun. 1998, pp. 1-4, http://www.intel.com/update/archive/psn/psn06985.pdf.

Huang, Peter, California Polytechnic State University *Design and Implementation of the CiNIC Software Architecture on a Windows Host*, Feb. 2001, pp. i-87, http://www.ee.calpoly.edu/3comproject/masters-thesis/Huang-Peter.pdf.; 97 pp.

Neeran, Karnik et al.; "Method and Apparatus for Cloning a Configuration of a Computer in a Data Center;" U.S. Appl. No. 12/131,706 filed Jun. 2, 2008; consisting of Specification, Claims and Abstract (15 pages); and Drawings (3 sheets).

Rho, Sue et al. "Configuring Requirements—Compliant Multi-Agent Systems," IEEE 2nd Symposium on Multi-Agent Security and Survivability; Aug. 30-31, 2005; IEEE; pp. 58-65.

Schuba, Christoph L. et al., "Scaling Network Services Using Programmable Network Devices," Computer, IEEE Service Center, vol. 38, No. 4, Apr. 1, 2005, pp. 52-60.

Simon (simon@yamaha.demon.cok.uk), Note, *Computer Systems Built to Order*, (2 pages).

Tong, Yuchu et al., "A Flexible Multimedia Cooperative Product Design Platform Framework," The 7th International Conference on Computer Supported Cooperative Work in Design; Sep. 25-27, 2002; IEEE; pp. 198-204.

Web Component, Using the Web Component, Copyright 1997, Template Software, Inc., 65 pp.

Workflow Template, Developing a WFT Workflow System. Whole manual, 1998; 353 pp.

Workflow Template, Using the WFT Development Environment, Whole manual, 1998; 413 pp.

Workflow Template, Using the Web Component, Whole manual, 1998; 66 pp.

\* cited by examiner

METHOD AND APPARATUS FOR MANAGING CONFIGURATIONS

CROSS-REFERENCE TO RELATED APPLICATIONS

This application contains subject matter that is related to the subject matter of U.S. patent application Ser. No. 11/809,419, filed May 31, 2007, entitled "Method and Apparatus for Generating Configuration Rules for Computing Entities within a Computing Environment using Association Rule Mining", which is herein incorporated by reference in its entirety.

BACKGROUND

1. Technical Field

Embodiments of the present invention generally relate to data center systems. More particularly, embodiments of the present invention relate to a method and apparatus for managing configurations of computer resources.

2. Description of the Related Art

Data centers are used to house mission critical computer systems and associated components. A data center includes environmental controls, such as air conditioning, fire suppression, and the like, redundant/backup power supplies, redundant data communications connections and high security among others. Typically, mid- to-large sized companies or organizations have one or more data centers. A bank, for example, may have a data center, where all its customers' account information is maintained, and transactions involving this data are performed. In another example, large cities may have multiple specific-purpose data center buildings in secure locations near telecommunications services. Most collocation centers and Internet peering points are located in these kinds of facilities.

Conventional enterprise data centers frequently accommodate thousands of servers, which are running hundreds of applications. In such centers, it is difficult to administer these servers so that all the servers are appropriately configured, patched, updated and the like, in accordance with the applications that the servers host.

In order to handle the aforementioned circumstances, the current practice is to utilize discovery tools to gather configuration data from the data center. Then, the configuration data is tested against a set of predefined rules, such as templates, reference configurations, gold standards, and the like, which are usually derived from 'best practices' or other Information Technology (IT) policies. If the test reveals a difference between the set of predefined rules and the configuration data, then a configuration is likely to be in violation of the predefined rules or anomalous. Eventually, the violations or anomalies are flagged for administrator attention. Furthermore, the difference also indicates that a resource within the data center is most likely misconfigured. Such misconfigured resources may cause performance and/or other issues for the data center.

Such violations or anomalies arise because not all applications, in conventional data centers, have a configuration reference template specified. In certain scenarios, even if the templates for some applications are specified, not all configuration parameters (or rules) may be codified. Some of the rules may potentially be overlooked owing to human error. Besides, the templates may be incomplete and/or incompletely implemented. Also, as data centers evolve over time, these rules have to be updated accordingly. In such evolution upgrades, the templates will lag behind the state of the data center. The lagging behind occurs because configuration sanity-checks on the templates take lower priority than keeping the applications available, updated and secure.

Data centers are usually managed in 'silos.' Within a given data center, storage administrators independently manage storage devices and specify their templates. More specifically, server templates are independently specified by server administrators, and so on. In such scenarios, configuration settings that span across these silos cannot be easily captured in templates. Thus, configuration errors that occur due to a lack of coordination among the administrators often remain undetected until the configuration data causes a performance issue.

As stated above, existing tools require a hard-coded set of rules against which the configuration data is checked. However, such tools fail to discover each and every configuration error. Moreover, domain expertise is needed to create this set of rules.

Accordingly, there is a need in the art for a method and apparatus for managing configurations to enforce data center compliance.

SUMMARY

Embodiments of the present invention comprise a method and apparatus for managing configurations of computing resources associated with a data center. According to one embodiment, a method for managing configurations in a computing environment comprises analyzing one or more first configurations using rule information to produce an analysis result where each of the one or more first configurations defines a configuration of a resource that is managed by the data center, training a Bayesian classifier using the analysis result, and classifying a second configuration using the trained Bayesian classifier.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the word "a" means "at least one" and the word "plurality" mean one or more, unless otherwise mentioned.

DETAILED DESCRIPTION

Figure 1:
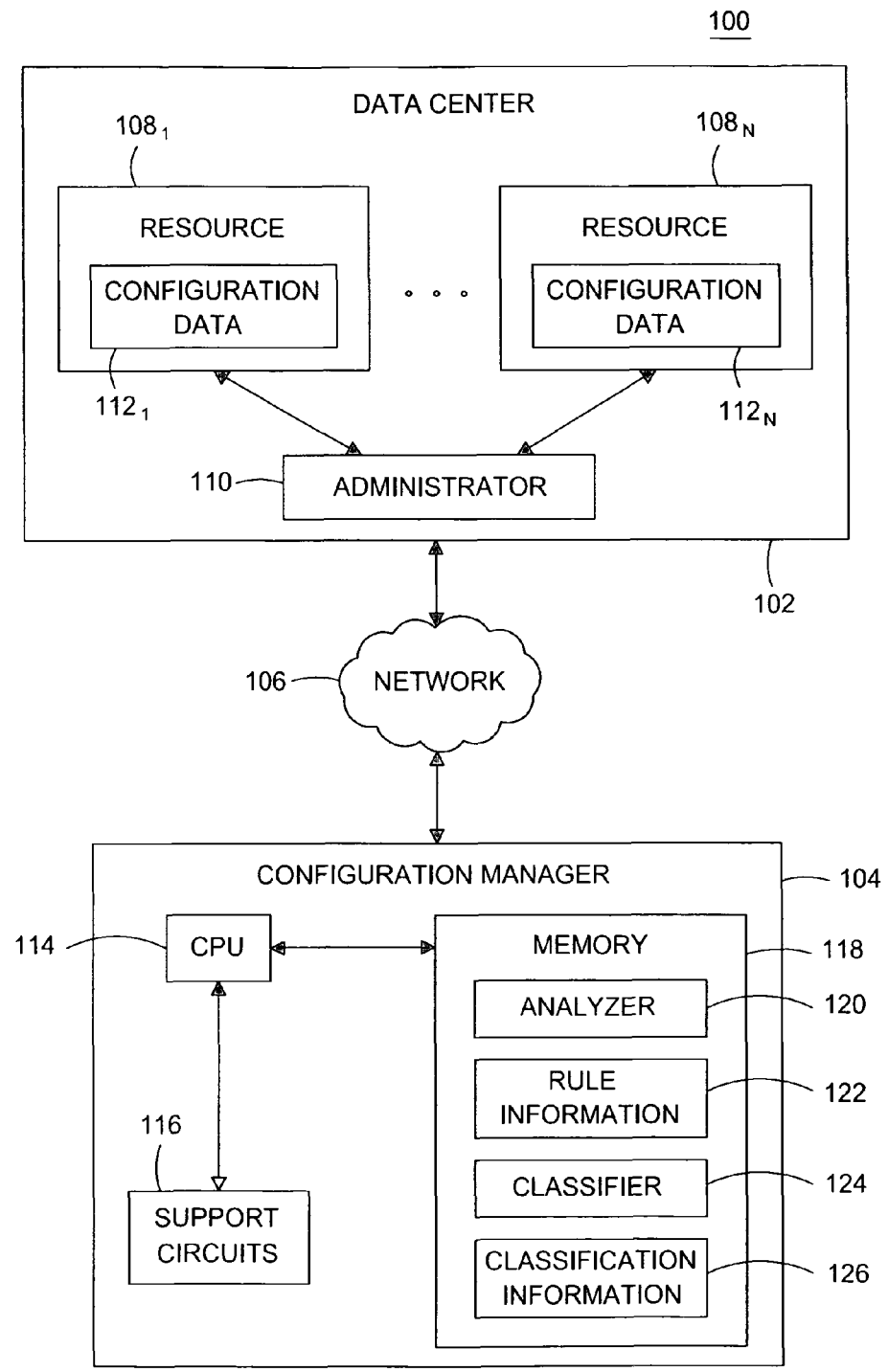
FIG. 1 is block diagram of a system for managing a plurality of configurations associated with a data center according to various embodiments of the present invention.

FIG. 1 is a block diagram of a system 100 for managing the plurality of configurations of computing resources associated with a data center 102, according to various embodiments of the present invention. The system 100 includes the data center 102, a configuration manager 104, each coupled to each other through a network 106.

The data center 102 accommodates a large number of devices, typically computers and communications equipment. As the name implies, the data center 102 is usually maintained by an organization for the purpose of handling the data necessary for its operations. For added security, redundancy and failure avoidance, the data center 102 may include environmental controls, such as air conditioning, fire suppression and the like, redundant/backup power supplies, redundant data communications connections and high security among other features.

The data center 102 comprises a plurality of resources 108 (illustrated as resource $108_1$, resource $108_2$ . . . resource $108_n$), and an administrator 110 coupled to each other via a network. The plurality of resources 108 comprises configuration data 112 (illustrated as configuration data $112_1$ . . . configuration data $112_n$). The configuration data 112 refers to information pertaining to the configurations of the plurality of resources 108 (e.g., configuration settings), as explained below.

The term "resource", as used herein, refers to any physical or virtual component available within a computer system. Every computing entity and/or peripheral device connected to a computer system is, potentially, a resource. Virtual resources include files, virtual block devices, network connections applications, processes, memory areas and the like. In its broadest sense; a resource is a component (whether physical or virtual) that facilitates the operation of the computing environment for its intended purpose. Therefore, the plurality of resources 108 may include any combination of hosts, client computing devices, servers, applications, database systems, storage systems, network infrastructure and the like.

The term "configuration", as used herein, refers to an arrangement or combination of functional and/or structural units according to their nature, number, and chief characteristics. Often, a configuration pertains to the choice of hardware, software, firmware, and documentation, as well as the specific selection of operational parameters, memory size, cache allocation, display resolution, network access bandwidth, redundancy requirements and the like. The configuration affects system function and performance. In computers and computer networks, the configuration often refers to the specific hardware and software details in terms of devices attached, systems utilized, device driver version, tunable parameter settings, capacity or capability, and exactly what computing entities comprise the system.

Hence, the configuration data 112 includes information regarding the combination of units that form any one resource of the plurality of resources 108. In one embodiment, the configuration data 112 includes descriptions of one or more applications, an operating system, various support circuits, a cache memory, one or more processors, a storage device, a networking component, a database system and/or a file system utilized at any of the plurality of resources 108.

In essence, the configuration data $112_1$ describes the combination of units that define the capabilities and uses of the resource $108_1$ (e.g., a host, a storage device, an application and the like). For instance, the configuration data $112_1$ may indicate that the resource $108_1$ uses a LINUX operating system, an ORACLE database, a VERITAS file system and one or more SYMANTEC security applications. Accordingly, the resource $108_1$ provides services related to the above combination of units. For example, the resource 1081 enables access to data mounted by the VERITAS file system through the LINUX operating system. Furthermore, the configuration data $112_1$ may also include version and/or license information. The version and/or license information indicates the capabilities and uses of the resource $108_1$. For example, a more recent version of the VERITAS file system includes more features and operates more efficiently than an older version of the VERITAS file system.

Communications within the data center 102 are often based on various networks running the Internet Protocol (IP) suite. The data center 102 contains at least one router and/or switch that transport traffic between the servers, and also to the network 106, for example, the Internet, and/or a private network, among others. Redundancy of the Internet connection is often provided by using two or more upstream service providers. Some of the servers at the data center 102 are used for running the basic Internet and intranet services needed by internal users in the organization: email servers, proxy servers, Domain Name System (DNS) servers, and the like. Network security elements are also usually deployed: firewalls, VPN gateways, intrusion detection systems, and the like. Also common are monitoring systems for the network and some of the applications. Additional off site monitoring systems are also typical, in case of a failure of communications inside the data center 102.

The network 106 comprises a communication system that connects a computer system by wire, cable, fiber optic, and/or wireless links facilitated by various types of well-known network elements, such as hubs, switches, routers, and the like. The network 106 may employ various well-known protocols to communicate information amongst the network resources. For example, the network 106 may be part of the Internet or intranet using various communications infrastructure such as Ethernet, WiFi, WiMax, General Packet Radio Service (GPRS), and the like. The network 106 runs the Internet Protocol (IP) suite. The network 106 comprises at least one router and/or switch (not shown) that transports data traffic in a well known manner within the data center 102 as well as between the data center 102 and the configuration manager 104 and the plurality of resources 108.

The configuration manager 104 comprises a central processing unit (CPU) 114, various support circuits 116 and a memory 118. The CPU 114 may comprise one or more commercially available microprocessors or microcontrollers that facilitate data processing and storage. The various support circuits 116 facilitate operation of the CPU 114 and include at least one of clock circuits, power supplies, cache, input/output circuits, and the like. The memory 118 comprises at least one of read only memory (ROM), random access memory (RAM), disk drive storage, optical storage, removable storage, and the like. The memory 118 includes various software packages, such as an operating system (not shown), an analyzer 120 and a classifier 124. The memory 118 further includes various data, such as rule information 122 and classification information 126.

The configuration manager 104 collects the configuration data 112 associated with the plurality of resources 108. In certain embodiments of the present invention, the configuration manager 104 aggregates each portion of the configuration data 112 from the plurality of resources 108. Data gathered at the host level may be in a different database versus data gathered from storage or network elements depending upon the monitoring system that is used for collecting this configuration data 112. This is also dependent upon which kind of monitoring/reporting mechanisms the administrator 110 chooses to use for the plurality of resources 108.

In one embodiment, the analyzer 120 applies one or more association rule mining algorithms (e.g., a market basket analysis) to discover relationships between the configuration attributes. From an analysis of the configuration data 112, the analyzer 120 infers rules associated with the configuration of the plurality of resources 108. Using the rules, the analyzer 120 generates rule information 122 configured to enable classification of the plurality of first configurations. Optionally, the analyzer 120 includes a mechanism for an administrator 110 to explicitly specify some rules. In one embodiment, the analyzer 120 generates the rule information 122 using the inferred rules in combination with the administrator-specified rules. U.S. patent application Ser. No. 11/809,419, entitled "Method and Apparatus for Generating Configuration Rules for Computing Entities within a Computing Environment using Association Rule Mining" incorporated herein by reference, provides a more detailed explanation of the generation of the rule information 122.

According to various embodiments, the analyzer 120 identifies misconfigured resources within the plurality of resources 108 (e.g., anomalous configurations) using the rule information 122. In one embodiment, the analyzer 120 compares the rule information 122 with the plurality of first configurations associated with the plurality of resources 108 to identify one or more misconfigured resources.

For example, the rule information 122 may indicate that resources using the LINUX operating system and the ORACLE database application have a 96% likelihood of also employing the VERITAS file system. As explained above, the association rule data mining algorithms discovers such relationships among the plurality of resources 108. In one embodiment, a resource having a configuration including the LINUX operating system, the ORACLE application but a file system different from the VERITAS file system is most likely a misconfigured resource and/or the configuration is most likely anomalous (e.g., violates the rule information 122). In one embodiment, the analyzer 120 classifies the configuration as anomalous. In another embodiment, the administrator 110 modifies the classification of the configuration to be normal instead of anomalous. Occasionally, the administrator 110 may modify a particular classification due to special circumstances (e.g., the resource has to perform an unusual task and requires the configuration to operate accurately). Accordingly, the classifier 124 must learn from the modification by the administrator 110 and classify a similar configuration in the future as normal and not anomalous in accordance with the desires of the administrator 110, as described further below.

According to various embodiments, the analyzer 120 produces an analysis result for the plurality of first configurations using the rule information 122. In one embodiment, the analyzer 120 identifies anomalies configurations 112 (e.g., violations of the rule information 122). The analyzer 120 may display the anomalous configurations and/or generate a notification or an alert for the administrator 110. In one embodiment, the analyzer 120 also identifies misconfigured resources (e.g., resources having one or more anomalous configurations). Hence, the analysis result produced by the analyzer 120 includes information pertaining to misconfigured resources and/or anomalous configurations in accordance with the rule information 122. U.S. patent application Ser. No. 11/809,419, entitled "Method and Apparatus for Generating Configuration Rules for Computing Entities within a Computing Environment using Association Rule Mining" incorporated herein by reference, provides a more detailed explanation of the detection of anomalous configurations or violations of the rule information 122.

The methodology employed by the analyzer 120 may be independent of semantics of the configuration data 112. Thus, the analyzer 120 applies to a range of application, operating system, server, storage and/or network related configuration data (e.g., parameters, settings, and the like) in addition to an assortment of data types, such as numeric, symbolic, Boolean, abstract (e.g., combination of various data types) and the like.

The classifier 124 (e.g., a Bayesian Classifier) uses the analysis result produced by the analyzer 120 (e.g., initial classifications of the plurality of first configurations) as a training set in order to learn and/or develop a robust classifier. Once trained, the classifier 124 is able to classify a second configuration (e.g., a new or recently modified configuration) of a resource that is managed by the data center 102 (e.g., the plurality of resources 108). In one embodiment, weights are utilized in classify the second configuration to best fit the classified plurality of first configurations. In other words, the classification of the second configuration must be consistent with the classification of similar configurations amongst the classified plurality of first configurations. Notably, in some embodiments, the classification of the second configuration must also be consistent with any previously modified classifications of any of the plurality of first configurations made by the administrator 110. In such embodiments, the one or more weights utilized by the classifier 124 are adjusted to fit and enable consistency with the modified classification. Overall, classification of configurations associated with the plurality of resources 108 facilitates a reduction in a number of violations that occur within the data center 102. In one embodiment, the classification information 126 stores the classified configurations provided by the analyzer 120.

In one embodiment, the classifier 124 is a machine learning process, such as a Bayesian Classifier. The Bayesian Classifier determines a hypothesis (i.e. hypothesized classification of any one of the plurality of first configurations) that is most probable based on observed evidence (e.g., the analysis result (i.e. initial classifications of the plurality of first configurations)) and/or classification rules (e.g., the rule information 122). Typically, the Bayesian classifier is an embodiment of Bayes' algorithm, which is an application of Bayes' Theorem on a Bayes' probability model.

According to one or more embodiments of the present invention, the following is an explanation of the application of the Bayes' Theorem:

h is a hypothesized classification of the second configuration.

D is configuration data representing the second configuration.

Each probability represents an event occurring within the Bayes' probability model as defined by the classification of the plurality of first configurations performed by the analyzer 120.

$$P(h/D) = \frac{P(D/h)P(h)}{P(D)}$$

P(h/D)=Probability of the hypothesized classification given the second configuration. P(h/D) is the probability that the second configuration should be classified as the hypothesized classification.

P(D/h)=Probability of the second classification given the hypothesized classification. P(D/h) is the probability that the second configuration exists amongst the plurality of first configurations associated with the hypothesized classification.

P(h)=Probability of the hypothesized classification occurring in the Bayes' probability model.

P(D)=Probability of the second configuration occurring in the Bayes' probability model.

Thus, each probability refers to an event occurring within the Bayes' probability model. Here, the Bayes' probability model is based on the initial classifications (e.g., the classified plurality of first configurations) as produced by the analyzer 120. P(h) refers to the likelihood of a type of classification given the initial classifications as indicated in the analysis result. For example, if half of the plurality of first configurations are classified as anomalous (e.g., violation of the rule information 122), then P(h=anomalous) is equal to fifty percent (50%). Furthermore, P(D) refers to the likelihood of a particular configuration given the plurality of first configurations. For example, if a quarter of the plurality of first configurations have the LINUX operating system, ORACLE database software and the VERITAS file system, then P(D=LINUX, ORACLE, VERITAS) is equal to twenty-five (25%).

In one embodiment, the Bayes' probability model may be represented by a plurality of weights for each of a plurality of features (e.g., units) of the plurality of first configurations. For example, there is a weight for each operating system, storage device, database application, file system and the like. Accordingly, the Bayesian classifier utilizes the weights to classify the second configuration to be fit the training set of initial classifications (e.g., the classified plurality of first configurations).

In operation, the modification of any of the initial classifications of the plurality of first configurations causes an adjustment of weights associated with the Bayesian classifier in order to classify the second configuration (e.g., configurations that are new or modified) correctly in the future. For example, the administrator 110 may decide to modify one of the initial classifications. Future classifications by the Bayesian Classifier must be in accordance with the modification by the administrator 110. In other words, the probability model (e.g., one or more weights of the Bayesian Classifier) associated with the initial classifications and the rule information 122 is modified. Hence, adjusting the weights facilitates the learning of the Bayesian classifier (e.g., learning from the modification to the classification). In one embodiment, the weights are values for one or more parameters associated with the Bayes' algorithm. The various values of the one or more parameters are calculated and/or adjusted based on the Bayes probability model.

Figure 2:
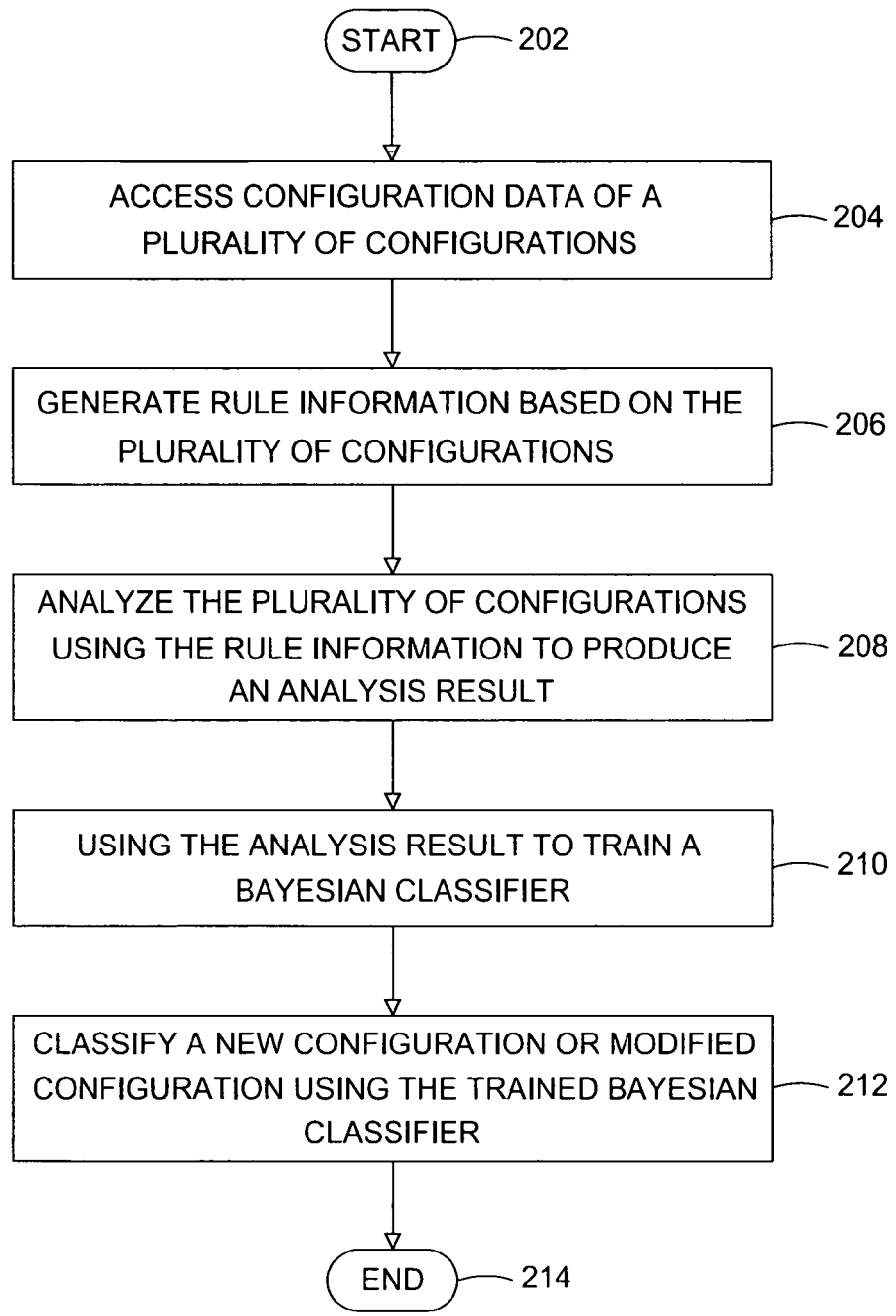
FIG. 2 is a flow diagram of a method for managing a plurality of configurations according to various embodiments of the present invention.

FIG. 2 illustrates a method 200 for managing a plurality of configurations, according to various embodiments of the present invention. The method has been explained with reference to the system 100 of FIG. 1, but may be embodied in any other system in accordance with one or more embodiments.

The method 200 starts at step 202 and proceeds to step 204, where the method 200 accesses the configuration data 112, which includes one or more configurations associated with the plurality of resources 108. In one embodiment, the configuration data 112 is accessed from a database comprising such data. At step 206, rule information is generated based on the multiple configurations using the analyzer 120. It must be noted here that the method 200 may start functioning with an empty rule-base, (e.g., without any hard coded knowledge about classifying configurations or rule information). In one embodiment, the association rule mining algorithm is applied to the configuration data 112 to determine one or more relationships within the plurality of configurations (e.g., the plurality of first configurations as explained above) and infer rules based on values of configuration attributes. The inferred rules facilitate the generation of the rule information 122. In one embodiment, the administrator determines the validity of the inferred rules and may change or delete any of the inferred rules. The administrator may also specify rules, which are used to facilitate the generator of the rule information 122.

At step 208, the configuration data 112 representing the plurality of configurations is analyzed using the rule information 122 to produce an analysis result. The step 208 is discussed further with respect to FIG. 3. At step 210, the analysis result is used to train the Bayesian classifier. The analysis result is used as an initial training set for the Bayesian classifier. In one embodiment, the Bayesian classifier uses the analysis result as basis for a Bayes' probability model comprising one or more weights for classifying a configuration of a resource managed by the data center 102. The Bayesian classifier learns from (e.g., conforms to) modifications to the classifications (e.g., performed by the administrator 110) by adjusting the one or more weights to account for the modification in future classifications (e.g., of the second configuration as explained above). The step 210 is discussed further with respect to FIG. 3.

At step 212, a new configuration or a modified configuration (e.g., the second configuration) is classified using the trained Bayesian classifier. The step 212 is discussed further with respect to FIG. 4. In one embodiment, the new configuration or the modified configuration are incorporated by adjusting the weights of the Bayesian classifier. The method 200 ends at step 214.

Figure 3:
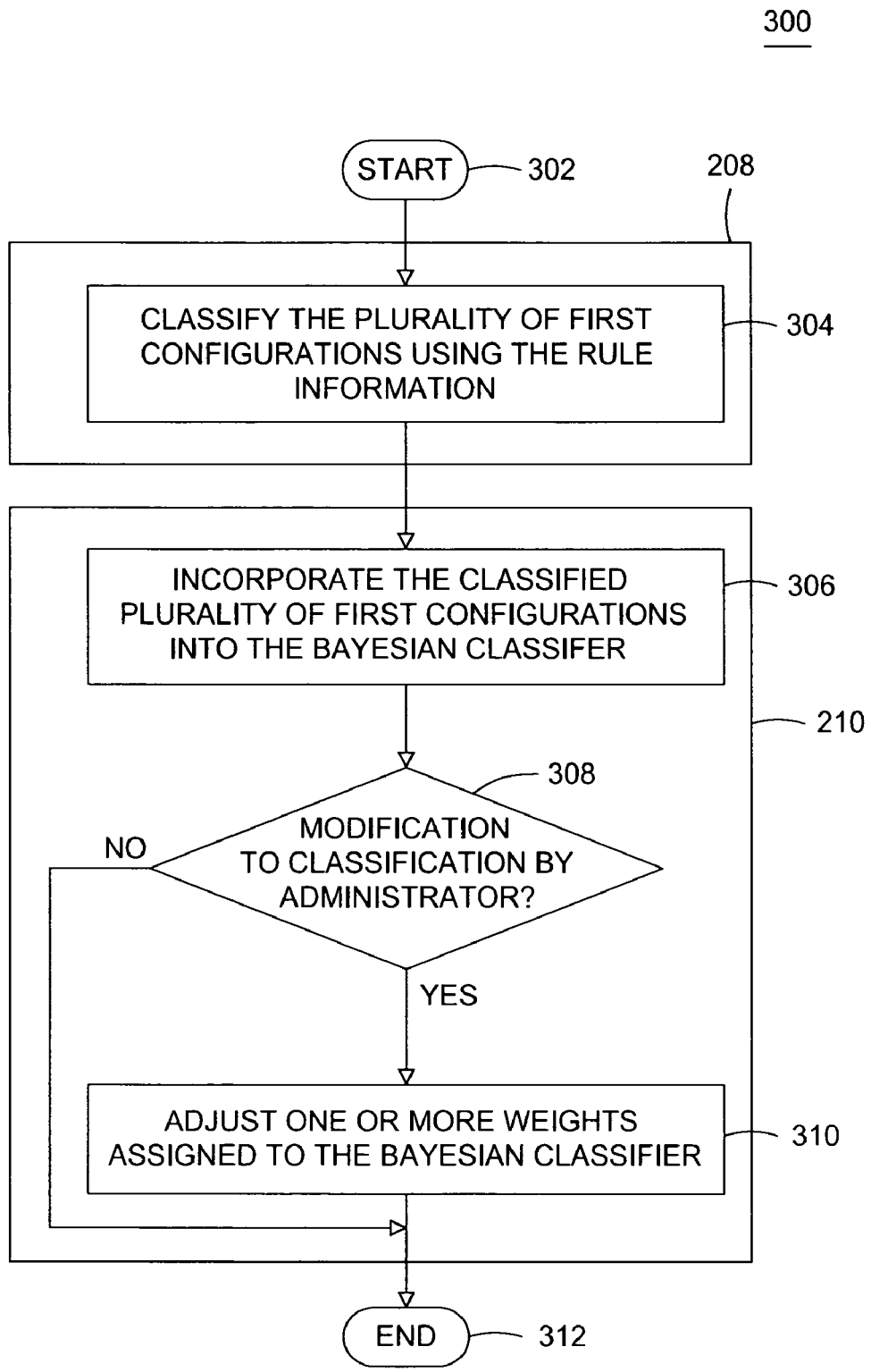
FIG. 3 is a flow diagram of a method for training the Bayesian classifier according to various embodiments of the present invention.

FIG. 3 illustrates a method 300 for training a Bayesian classifier, according to various embodiments of the present invention. The method 300 begins at step 302 and proceeds to step 304, at which point the plurality of first configurations are classified using the rule information 122. Here, anomalous configurations, and/or misconfigured resources are identified based on the rule information 122.

At step 306, the classified configurations are incorporated into the Bayesian classifier and used as an initial training set. Once trained, the Bayesian classifier can be used to classify a second configuration (e.g., a new configuration or a modified configuration) automatically and accurately as described with respect to FIG. 4.

At step 308, a determination is made as to whether any of the plurality of first configurations has been modified (e.g., by the administrator 110). If one or more classifications of the plurality of first configurations has been modified (option "YES"), the method 300 proceeds to step 310. At step 310, at least one weight associated with the Bayesian classifier is adjusted. The adjusted at least one weight accounts for the modified classification in the Bayes' probability model. The adjustment facilitates consistency in classifying the second configuration with respect to the modified classification. The method 300 then proceeds to step 312. If, at step 308, it is determined that one or more of the plurality of first configurations has not been modified (option "NO"), the method 300 proceeds to step 312. The method 300 ends at step 312.

Figure 4:
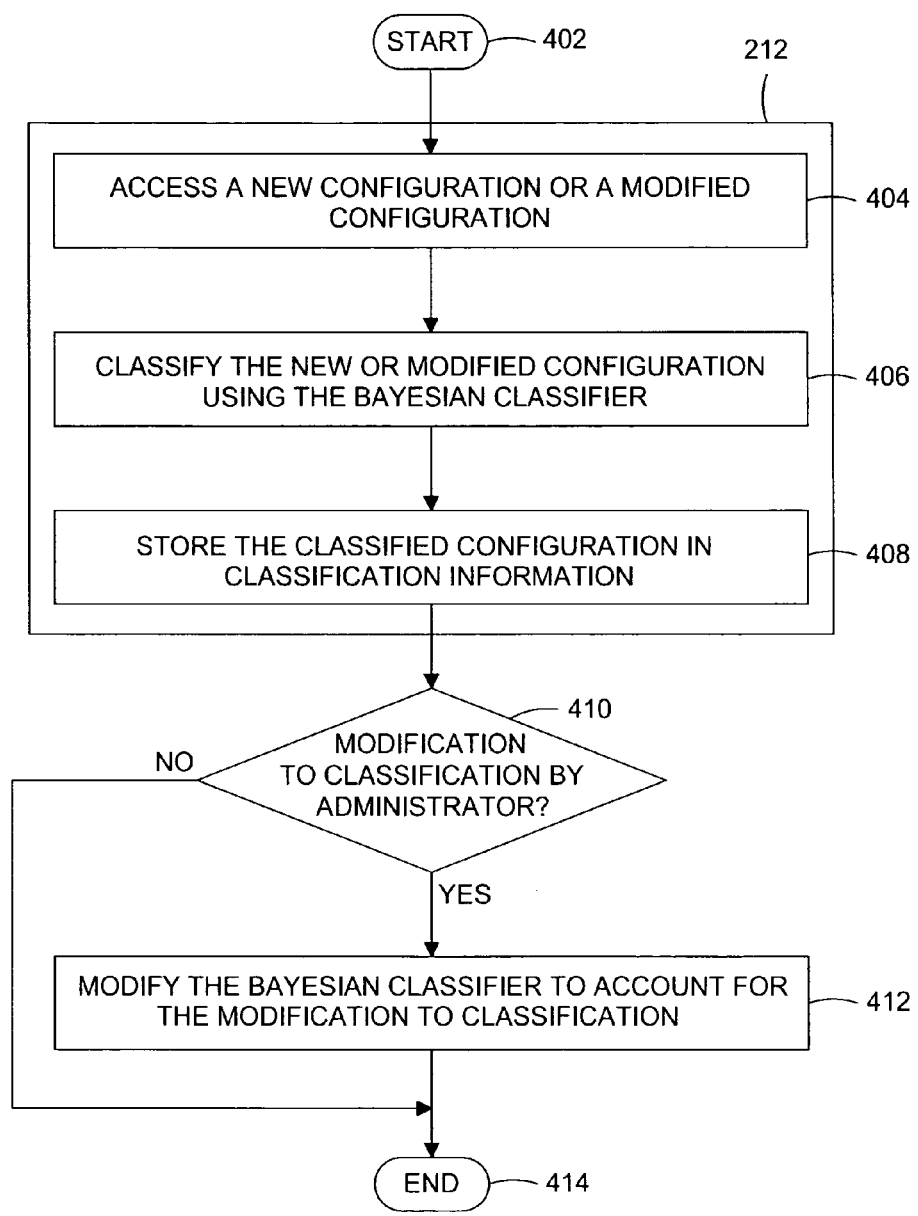
FIG. 4 is a flow diagram of a method for classifying a new or modified configuration according to various embodiments of the present invention.

FIG. 4 illustrates a method 400 for classifying a new or modified configuration, according to one embodiment of the present invention. The method 400 starts at step 402 and proceeds to step 404, at which a new configuration or a modified configuration is accessed. At step 406, the new or modified configuration is classified using the Bayesian classifier (previously trained). At step 408, the classified configuration is stored in the classification information 126. In one embodiment, the steps 404 to 408 form the step 212 of the method 200 as described for FIG. 2.

At step 410, a determination is made as to whether the classification of the new or modified configuration has been modified. In one embodiment, the administrator 110 decides to overwrite the classification of the new or modified configuration. If the classification has been modified (option "YES"), the method 400 proceeds to step 412. If the classification has not been modified (option "NO"), the method 400 proceeds to step 414.

At step 412, the Bayesian classifier is modified to be consistent with the modification to the classification of the new or modified configuration. In one embodiment, the probabilities that comprise the Bayes' probability model associated with the Bayesian classifier requires modification in order to learn from the modification in the classification. For example, the weights assigned to or associated with the classifier are adjusted. This is done, for example, to make future classifications of configurations in conformity with the current classifications. The method 400 proceeds to step 414. The method 400 ends at step 414.

According to various embodiments of the present invention, once a classification has been deduced, the administrator 110 is able to make better decisions for improving the efficiency of the data center 102 and the productivity of various users. For example, once an anomalous configuration is detected, the administrator 110 can rapidly modify the configuration to comply with the rule information 122. Furthermore, the administrator can use the classifier 124 to ensure proper configuration of each of the plurality of resources 108. Moreover, the classifier 124 can be employed by the administrator 110 to enforce data center compliance.

The present disclosure is intended to cover all equivalent embodiments, and is limited only by the appended claims. Various other embodiments are possible within the spirit and scope of the invention. While the invention may be susceptible, to various modifications and alternative forms, the specific embodiments have been shown by way of example in the drawings and have been described in detail herein. The aforementioned specific embodiments are meant to be for explanatory purposes only, and not intended to delimit the scope of the invention. Rather, the invention is to cover all modifications, equivalents, and alternatives falling within the spirit and scope of the invention as defined by the following appended claims.

What is claimed is:

1. A method of managing configurations, comprising:
analyzing one or more first configurations out of a plurality of configurations using rule information to produce an analysis result, wherein
each first configuration defines a configuration of a resource that is managed by a data center,
analyzing the first configuration(s) comprises classifying the first configuration(s) using the rule information, and
the analysis result comprises the classified first configuration(s);
training a Bayesian classifier using the analysis result; and
classifying a second configuration using the trained Bayesian classifier.

2. The method of claim 1, wherein the second configuration comprises at least one of a new configuration or a modified first configuration.

3. The method of claim 1, wherein training the Bayesian classifier further comprises incorporating the classified first configuration(s) into the Bayesian classifier.

4. The method of claim 1, further comprising modifying a classification of at least one of the classified first configuration(s) or the classified second configuration.

5. The method of claim 1, wherein
the training of the Bayesian classifier operates to generate one or more weights, and the trained Bayesian classifier uses the weight(s) to perform the classifying; and further comprising:
modifying the trained Bayesian classifier based on a modification of at least a portion of the analysis result including a modification of the classification of the at least one of the classified first configuration(s) or the classified second configuration, wherein
the modifying the trained Bayesian classifier comprises adjusting the weight(s) of the trained Bayesian classifier based on the modification of the at least a portion of the analysis result.

6. The method of claim 1, wherein
each first configuration comprises one or more features that indicate the configuration of the respective resource, and
the weight(s) are associated with the feature(s) of the first configuration(s).

7. The method of claim 1, further comprising evaluating at least one property of the first configuration(s).

8. The method of claim 1, further comprising evaluating configuration data to determine a relationship amongst the first configuration(s).

9. The method of claim 1, wherein analyzing the first configuration(s) further comprises identifying at least one configuration based on a violation of at least a portion of the rule information.

10. The method of claim 1, wherein analyzing the first configuration(s) further comprises identifying at least one configuration in compliance with at least a portion of the rule information.

11. A configuration manager, comprising:
a configuration analyzer for classifying one or more first configurations out of a plurality of configurations based on rule information to produce an analysis result, wherein each configuration defines a configuration of a respective resource, and each resource is managed by a data center; and
a classifier for classifying a second configuration, wherein
the analysis result is used to train the classifier,
the trained classifier is operable to be applied to at least one of a new configuration or a modified configuration of the first configuration(s) to perform a classification of that configuration, and
the analysis result comprises the classified modification of the first configuration(s), and the trained classifier is applied to classify the second configuration.

12. The configuration manager of claim 11, wherein the trained classifier is modified in response to a modification of the at least one of the classified first configuration(s) or the classified second configuration.

13. The configuration manager of claim 12, wherein
the classifier generates one or more weights during the training,
the trained classifier uses the weight(s) when performing the classification, and
the trained classifier adjusts at least one weight in response to the modified classification.

14. A system for managing configurations, comprising:
a data center, comprising:
   a plurality of resources comprising configuration data associated with one or more first configurations for the plurality of resources; and
   a configuration manager, comprising:
      a configuration analyzer for classifying the first configuration(s) based on rule information and for generating an analysis result, wherein
      the configuration manager is operable to receive input modifying a classification of at least one of the first configuration(s) or the classified second configuration, and
      the analysis result comprises the classified first configuration(s), and
      a statistical classifier for classifying a second configuration, wherein
      the statistical classifier is operable to be trained using the analysis result.

15. The system of claim 14, wherein the trained statistical classifier is operable to be modified in response to the modified classification.

16. The system of claim 15, wherein
the statistical classifier is operable to generate one or more weights during the training,
the trained statistical classifier is operable to adjust at least one weight to be consistent with the modified classification, and
the trained statistical classifier is operable to perform the classifying of the second configuration using the weight(s).

17. The system of claim 16, wherein the configuration analyzer is operable to determine at least one misconfigured resource within the plurality of resources based on the rule information.

* * * * *